US007192148B2

(12) United States Patent
Tsai et al.

(10) Patent No.: US 7,192,148 B2
(45) Date of Patent: Mar. 20, 2007

(54) ILLUMINATED LOGO UNIT WITH REFLECTIVE DEVICE

(75) Inventors: Ming-Chiang Tsai, Tu-Chen (TW); Chun-Yu Lee, Tu-chen (TW); Tsung-Wei Chiang, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 148 days.

(21) Appl. No.: 10/899,533

(22) Filed: Jul. 26, 2004

(65) Prior Publication Data

US 2005/0018414 A1 Jan. 27, 2005

(30) Foreign Application Priority Data

Jul. 25, 2003 (TW) .............................. 92120351 A

(51) Int. Cl.
*G01D 11/28* (2006.01)
*F21V 7/10* (2006.01)
*G09F 13/18* (2006.01)

(52) U.S. Cl. .......................... 362/29; 362/30; 362/216; 40/546; 40/564

(58) Field of Classification Search .................. 362/29, 362/216, 245, 247; 40/546, 564; 349/63
See application file for complete search history.

(56) References Cited

U.S. PATENT DOCUMENTS 2,651,864 A * 9/1953 Howenstine ................. 40/546
RE24,728 E * 10/1959 Montebello ................. 362/223
4,952,023 A * 8/1990 Bradshaw et al. .......... 359/529
4,989,122 A * 1/1991 Allekotte et al. ............. 362/97
4,989,956 A * 2/1991 Wu et al. ...................... 349/71
5,708,487 A * 1/1998 Bergman ...................... 349/63
6,079,844 A * 6/2000 Whitehead et al. ........... 362/97
6,174,075 B1 1/2001 Fuwausa
6,840,656 B2 * 1/2005 Kuo ........................... 362/330
2004/0139636 A1 * 7/2004 Lin ............................ 40/546
2005/0072032 A1 * 4/2005 McCollum et al. ........... 40/546
2006/0021267 A1 * 2/2006 Matsuda et al. .............. 40/546

* cited by examiner

*Primary Examiner*—Renee Luebke
*Assistant Examiner*—Evan Dzierzynski
(74) *Attorney, Agent, or Firm*—Wei Te Chung

(57) ABSTRACT

An illuminated logo unit (300) includes a reflective device (320), a pattern panel (301), and an illuminator (311). The reflective device includes a bottom portion (323) and a circumferential portion (321). The circumferential portion defines a concavity (360). The pattern panel is disposed over the reflective device, and includes a pattern (304) and a transparent body (302). The illuminating means illuminator is received in the concavity. The illuminated logo unit further includes a transflective film (305) disposed under the pattern panel opposite to the bottom portion. Virtually all light emitting from the illuminating means illuminator is reflected more than once by the circumferential portion, the bottom portion and/or a transflective film before it reaches the pattern, This improves the overall brightness of the illuminated logo unit.

13 Claims, 2 Drawing Sheets

ILLUMINATED LOGO UNIT WITH REFLECTIVE DEVICE

BACKGROUND OF THE INVENTION

1. Field of the Invention

The present invention relates to logo units used for displaying images such as for advertising, and particularly to an electrically illuminated logo unit.

2. Description of the Prior Art

A conventional logo unit, such as a registration mark on a billboard or an insignia on a vehicle, cannot illuminate itself. If the image of the logo unit is to be clearly seen at night, it must be illuminated by a light source, which is usually an external light source. However, external illumination has various inherent limitations, including the angle of illumination, the brightness of the source, and the reflective ratio of the logo unit. These limitations frequently result in the logo unit being unevenly illuminated. Furthermore, the brightness and overall aesthetic display of the logo unit may be unsatisfactory.

Generally, to solve the above-described problems, an active light source is arranged at the back of the logo unit. A logo unit having an active light source arranged at the back thereof is known as an illuminated logo unit.

A conventional illuminated logo unit as disclosed in U.S. Pat. No. 6,174,075 is represented in FIGS. 4 and 5. The illuminated logo unit 1 includes a pattern body 12, a frame 16 arranged around a periphery of the pattern body 12, and a point light source 101 arranged at the back of the pattern body 12. The pattern body 12 is elliptical, and includes a pattern 121, a top surface 17, a cavity 18, and a bottom surface 19. The pattern 121 defines a projection surface (not labeled) on the bottom surface 19. The cavity 18 is defined between the top surface 17 and the bottom surface 19. The point light source 101 is a light emitting diode (LED), and is secured in the cavity 18. In particular, the point light source 101 is arranged at a center of the projection surface defined on the bottom surface 19.

Because the point light source 101 is arranged at the center of the projection surface, the distribution of light energy over the whole projection surface from the point light source 101 is uneven. For example, a central circular area 100 of the pattern body 12 receives much more light energy from the point light source 101 than other portions of the pattern body 12. Accordingly, a brightness of the pattern 121 is not uniform. The result is that the overall pattern 121 cannot be clearly seen at night.

SUMMARY OF THE INVENTION

An object of the present invention is to provide an illuminated logo unit which has high brightness and uniformity of illumination.

In order to achieve the object set forth, an illuminated logo unit of the present invention includes a reflective device, a pattern panel, and an illuminating means. The reflective device includes a bottom portion and a circumferential portion. The circumferential portion defines a concavity. The pattern panel is disposed over the reflective device, and includes a pattern and a transparent body. The illuminating means is received in the concavity.

In an exemplary embodiment of the present invention, the illuminated logo unit further includes a transflective film. Therefore virtually all light emitting from the illuminating means is reflected more than once by the circumferential portion, the bottom portion and/or the transflective film before it reaches the pattern. This enhances the overall reflectivity and utility of light beams of the illuminated logo unit. It also enhances uniform distribution of light energy over the whole surface of the pattern panel, so that an overall brightness of the illuminated logo unit is improved. Even at night, the illuminated logo unit can be clearly viewed. The illuminated logo unit may be used for applications such as in a billboard, a logo displayed on a vehicle, and so on.

Other objects, advantages and novel features of the invention will become more apparent from the following detailed description when taken in conjunction with the accompanying drawings.

DETAILED DESCRIPTION OF THE INVENTION

Figure 1:
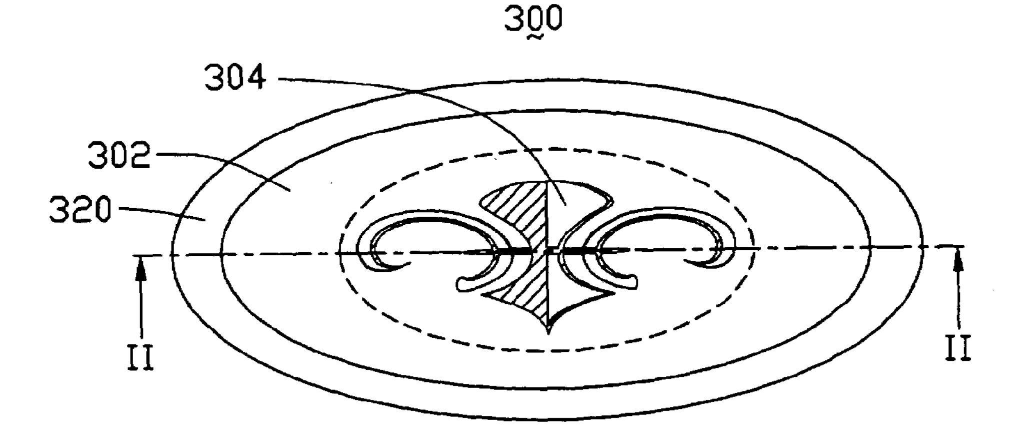
FIG. 1 is a schematic, isometric view of an illuminated logo unit according to the exemplary embodiment of the present invention.
Figure 2:
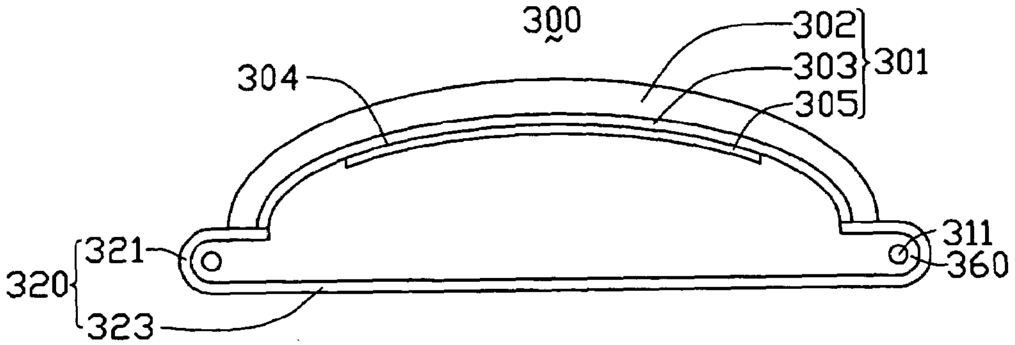
FIG. 2 is a schematic, cross-sectional view taken along line 11—11 of FIG. 1.
Figure 3:
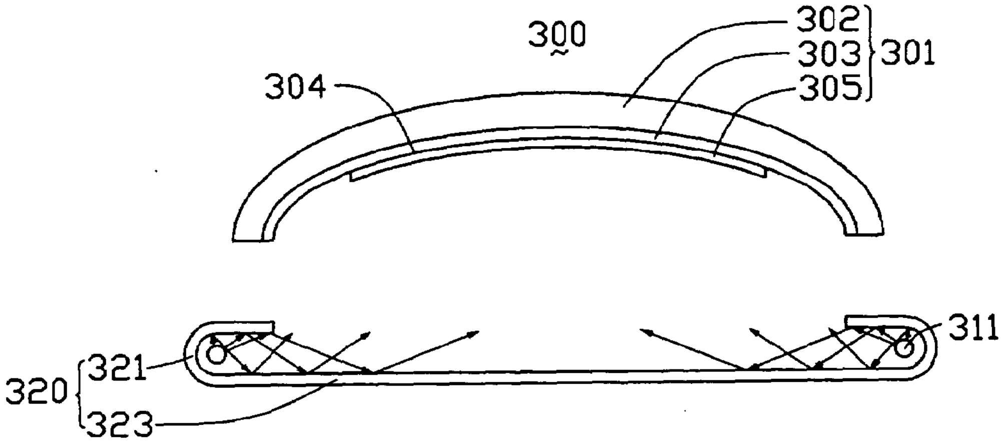
FIG. 3 is an exploded view of FIG. 2, showing light paths in operation of the illuminated logo unit.
Figure 4:
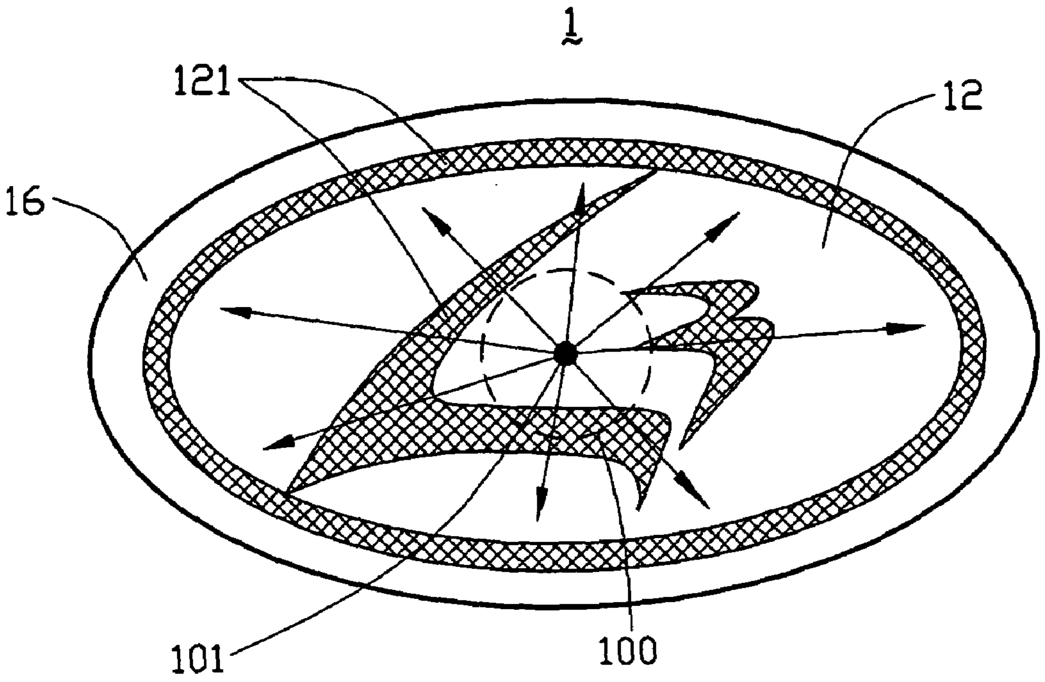
FIG. 4 (PRIOR ART)
FIG. 4 is a schematic, isometric view of a conventional illuminated logo unit, showing light paths thereof.
Figure 5:
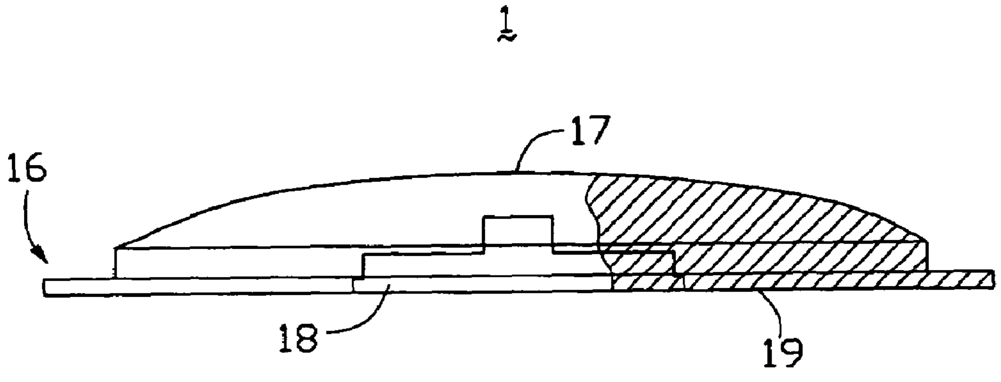
FIG. 5 (PRIOR ART)
FIG. 5 is a schematic, side cross-sectional view of the illuminated logo unit of FIG. 4, showing an inner configuration thereof.

Referring to FIGS. 1 and 2, an illuminated logo unit 300 in accordance with the exemplary embodiment of the present invention is generally elliptical, and includes a pattern panel 301, an illuminating means 311 and a reflective device 320. The pattern panel 301 is made of a soft material and is arranged (as best seen in FIGS. 2 and 3). in its entirety, over the reflective device 320. The pattern panel 301 may alternatively be made of a hard material, and be fixed on the reflective device 320 by a frame or a fastener.

The pattern panel 301 includes a transparent body 302, a scattering layer 303, a transflective film 305, and a pattern 304. The transparent body 302 is used to protect the pattern 304 from becoming worn or damaged, and is made of a highly transparent material in order to allow maximum transmission of light. Alternatively, if the need for transparency is not paramount or if the pattern panel 301 does not incorporate the scattering layer 303, the transparent body 302 may be made of a translucent material instead. Further, for enhancing the chroma and displaying multi-color images, the transparent body 302 can be made of different colored materials. In order to avoid leakage of light, a circumferential sidewall portion of the transparent body 302 is reflective. The scattering layer 303 is disposed under the transparent body 302, and diffuses light received from the illuminating means 311. The scattering layer 303 is formed by mechanical processing or chemical etching of the transparent body 302 itself. The transflective film 305 is disposed under the scattering layer 303, opposite to the reflective device 320. The transflective film 305 can be made of a translucent material, or a reflective material having numerous apertures formed therein. The pattern 304 is attached between the scattering layer 303 and the transflective film 305.

The reflective device 320 includes a bottom portion 323 and a circumferential portion 321. The circumferential portion 321 defines a concavity 360. The concavity 360 is annular. The reflective device 320 is made of a highly reflective material, for reflecting light received from the illuminating means 311. Alternatively, the reflective device 320 can include a reflective film (not shown) disposed on an inner surface thereof. The illuminating means 311 is arranged in the concavity 360, preferably at a vertical mid-elevation of the concavity 360.

The illuminating means 311 is a plurality of LEDs, a plurality of Organic Light Emitting Diodes (OLEDs), or a circumferential Cold Cathode Fluorescent tube (CCFL).

Referring to FIG. 3, virtually all the light emitting from the illuminating means 311 is reflected more than once by the circumferential portion 321, the bottom portion 323 and/or the transflective film 305 before it reaches the pattern 304. This enhances the overall reflectivity and utility of light beams of the illuminated logo unit 300. It also enhances uniform distribution of light energy over the whole surface of the pattern panel 301, so that an overall brightness of the illuminated logo unit 300 is improved. Even at night, the illuminated logo unit 300 can be clearly viewed.

The illuminated logo unit 300 may be used for applications such as in a billboard, a logo displayed on a vehicle, and so on. For example, if the illuminated logo unit 300 is used as a logo displayed on a vehicle, an electrical input terminal (not shown) of the illuminated logo unit 300 can be connected with an output terminal of a battery of the vehicle. That is, the energy needed by the illuminated logo unit 300 can be supplied by a general power supply of the vehicle itself.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An illuminated logo unit, comprising: a reflective device including a bottom portion and a circumferential portion; a pattern panel disposed over the reflective device, the pattern panel including a pattern, a transparent body, and a scattering layer, the scattering layer being disposed between the transparent body and the pattern; and an illuminating means located below said pattern panel, said illuminating means being configured so as to be unable to directly emit light toward the pattern panel in an upward direction but through a series of reflections via said reflective device.

2. An illuminated logo unit, comprising: a reflective device including a bottom portion and a circumferential portion; a pattern panel disposed over the reflective device, the pattern panel including a pattern, a transparent body, and a scattering layer; a transflective film disposed under the pattern panel opposite to the bottom portion; and an illuminating means located in the circumferential portion and being unable to directly emit light toward the pattern panel in an upward direction but through a series of reflections via said reflective device, wherein the pattern is disposed between the scattering layer and the transflective film, with the pattern and the transflective layer being under the scattering layer.

3. The illuminated logo unit of claim 2 wherein the transflective film is made of a translucent material.

4. The illuminated logo unit of claim 2, wherein the transflective film is made of a reflective material having apertures formed therein.

5. The illuminated logo unit of claim 2, wherein a circumferential sidewall portion of the transparent body is reflective.

6. The illuminated logo unit of claim 2, wherein the transparent body is made of a highly transparent material.

7. The illuminated logo unit of claim 2, wherein the transparent body comprises at least one colored material.

8. The illuminated logo unit of claim 2, wherein the scattering layer disposed under the transparent body.

9. The illuminated logo unit of claim 2, wherein the illuminating means comprises at least one of a plurality of light emitting diodes, a plurality of organic light emitting diodes, and a cold cathode fluorescent tube.

10. The illuminated logo unit of claim 2, wherein the pattern panel is disposed, in its entirety, over the reflective device.

11. The illuminated logo unit of claim 2, wherein the circumferential portion has a concavity defined therein for receiving the illuminating means.

12. The illuminated logo unit of claim 2 wherein the illuminating means is received in the concavity at a mid-elevation thereof.

13. The illuminated logo unit of claim 11 wherein the concavity is annular.

* * * * *